(12) United States Patent
Yoshioka et al.

(10) Patent No.: US 6,608,853 B1
(45) Date of Patent: Aug. 19, 2003

(54) DISCHARGE ELECTRODES STRUCTURE FOR LASER APPARATUS AND LASER APPARATUS THEREWITH

(75) Inventors: Shunsuke Yoshioka, Oyama (JP); Natsushi Suzuki, Oyama (JP)

(73) Assignee: Komatsu, Ltd., Tokyo (JP)

( * ) Notice: Subject to any disclaimer, the term of this patent is extended or adjusted under 35 U.S.C. 154(b) by 239 days.

(21) Appl. No.: 09/648,752

(22) Filed: Aug. 28, 2000

(51) Int. Cl.[7] ............................................... H01S 3/097
(52) U.S. Cl. ........................................... 372/87; 372/57
(58) Field of Search .............................. 372/57, 59, 87

(56) References Cited

U.S. PATENT DOCUMENTS

| | | | |
|---|---|---|---|
| 4,959,840 A | | 9/1990 | Akins et al. |
| 5,247,534 A | * | 9/1993 | Muller-Horsche ............ 372/58 |
| 5,373,523 A | * | 12/1994 | Fujimoto et al. ............ 372/59 |
| 5,923,693 A | * | 7/1999 | Ohmi et al. .................. 372/57 |
| 5,978,405 A | * | 11/1999 | Juhasz et al. ................ 372/57 |
| 6,018,537 A | * | 1/2000 | Hofmann et al. ............. 372/25 |
| 6,052,402 A | * | 4/2000 | Murray et al. ................ 372/87 |

* cited by examiner

*Primary Examiner*—Paul Ip
*Assistant Examiner*—Davienne Monbleau
(74) *Attorney, Agent, or Firm*—Armstrong, Westerman & Hattori, LLP.

(57) ABSTRACT

The invention provides a discharge electrodes structure which can be easily replaced and adjustable a distance between the discharge electrodes, and a laser apparatus employing the discharge electrodes. Accordingly, the laser apparatus is provided with a pair of anode (5A) and cathode (5B) provided within a laser chamber (2) for sealing a laser medium in an opposing manner, generating a discharge so as to excite the laser medium and oscillating a laser beam, a conductive anode base (6) holding the anode, an insulative cathode base (8) placed so as to close an opening portion (4) provided in the laser chamber and holding the cathode, a return plate (9) suspending the anode base from the cathode base so as to supply a current to the anode, and an anode support bar (23) for connecting the cathode base to the anode base so as to suspend the anode from the cathode base.

7 Claims, 13 Drawing Sheets

DISCHARGE ELECTRODES STRUCTURE FOR LASER APPARATUS AND LASER APPARATUS THEREWITH

FIELD OF THE INVENTION

The present invention relates to a laser apparatus, and more particular to a discharge electrodes structure in a laser apparatus and a laser apparatus provided with the discharge electrodes.

BACKGROUND OF THE INVENTION

Conventionally, there has been known a laser apparatus which excites a laser medium in accordance with a discharge so as to oscillate a laser beam, and the laser apparatus is, for example, described in U.S. Pat. No. 4,959,840. FIG. 24 shows a cross section near discharge electrodes of an excimer laser apparatus disclosed in the publication, and a description will be given of a conventional art on the basis of FIG. 24.

In FIG. 24, an excimer laser apparatus 101 is provided with a laser chamber 102 for sealing a laser medium such as a laser gas or the like. the laser chamber 1–2 can be freely divided into an upper chamber 102A and a lower chamber 102B. A pair of discharge electrodes 105A and 105B constituted by an anode 105A and a cathode 105B for generating a discharge so as to excite a laser gas and oscillate a laser beam are arranged in an inner portion of the laser chamber 102 in an opposing manner.

The anode 105A is fixed to an anode base 106 made of a conductive body by a bolt 160, and the anode base 106 is gripped between the upper chamber 102A and the lower chamber 102B. Accordingly, the anode 105A is in the same electric potential as that of the laser chamber 102 (is grounded).

Further, the cathode 105B is fixed to a cathode supporting member 108 made of an insulative body by a high voltage current supply rod 112, and is electrically insulated from the laser chamber 102 by insulative members 109 and 110 made of an insulative body such as a ceramic or the like. A high voltage current for being discharged to the cathode 105B is supplied by the high voltage current supply rod 112.

However, the conventional art disclosed in U.S. Pat. No. 4,959,840 has the following problems.

That is, during the discharge operation, the opposing portions of the discharge electrodes 105A and 105B are gradually abraded and consumed. Accordingly, an interval between the discharge electrodes 105A and 105B is increased, and a shape of the discharge electrodes 105A and 105B is changed. Therefore, since the discharge operation becomes unstable so as to prevent a power of the laser beam from changing, it is necessary to regularly replace the discharge electrodes 105A and 105B. In particular, since the anode 105A is greatly consumed in comparison with the cathode 105B, it is necessary to frequently replace the anode 105A.

However, in accordance with the conventional art, the cathode 105B is fixed to the upper chamber 102A and the anode 105A is gripped between the upper chamber 102A and the lower chamber 102B. Accordingly, in order to replace the discharge electrodes 105A and 105B, it is necessary to separate the upper chamber 102A from the lower chamber 102B, replace the discharge electrodes 105A and 105B, thereafter again assemble the upper chamber 102A and the lower chamber 102B, so that a lot of labor and time are required. Further, at this time, in order to stabilize the discharge operation, it is necessary to accurately adjust a distance between the anode 105A and the cathode 105B in a state of assembling the anode 105A and the cathode 105B in the laser chamber 102, and this adjustment required a lot of labor and time.

Further, by separating the upper chamber 102A and the lower chamber 102B, an inner wall of the laser chamber 102 and parts such as a blower (not shown) or the like arranged in an inner portion of the laser chamber 102 are exposed to an air. As a result, a moisture content and an impurity contained in the air are attached to the inner wall of the laser chamber 102, the blower or the like so as to soil the laser gas, so that a power of the laser beam is reduced. In order to prevent the power from being reduced, there is required a passivation corresponding to an operation of removing the attached moisture content and impurity. Accordingly, it is necessary to stop the excimer laser apparatus 1 for a long time at every replacement of the discharge electrodes 105A and 105B, so that the machine availability is reduced.

SUMMARY OF THE INVENTION

The present invention is made by solving the problems in the conventional art mentioned above, and an object of the present invention is to provide a discharge electrodes structure which can be easily replaced and adjustable a distance between the discharge electrodes, and a laser apparatus employing the discharge electrodes.

In order to achieve the object mentioned above, in accordance with the present invention, there is provided a laser apparatus provided with a discharge electrodes structure comprising:

a pair of anode and cathode provided within a laser chamber for sealing a laser medium in an opposing manner, generating a discharge so as to excite the laser medium and oscillating a laser beam;

a conductive anode base holding the anode;

an insulative cathode base placed so as to close an opening portion provided in the laser chamber and holding the cathode; and a return plate suspending the anode base from the cathode base so as to supply a current to the anode.

In accordance with the structure mentioned above, since the anode is suspended from the cathode by the return plate, it is possible to integrally attach and detach the anode and the cathode to and from the laser chamber at a time of replacing any one of the anode and the cathode. Accordingly, when the structure is made, for example, such that the anode and the cathode are assembled in an external portion of the laser chamber so as to unite and the unit is replaced, it is possible to save labor and time for assembly in comparison with the case of independently assembling the anode and the cathode within the laser chamber.

Further, the laser apparatus provided with the discharge electrodes structure may further comprise an anode support bar for connecting the cathode base to the anode base so as to suspend the anode from the cathode base.

In accordance with the structure mentioned above, since the anode is suspended by not only the return plate but also the anode support bar, it is possible to weaken a strength of the return plate so as to make a thickness and a width of the return plate thin. Accordingly, the return plate does not disturb a flow of the laser medium flowing between the anode and the cathode, so that a flow speed becomes fast and the discharge operation is stably performed.

In addition, for example, when the structure is made such that the anode support bar is provided with a mechanism for positioning the anode and the cathode with respect to each other, it is easy to assemble the anode and the cathode.

Further, the laser apparatus provided with the discharge electrodes structure may be structured such that the anode base is freely separated into an upper anode base for holding the anode and a lower anode base connected to the return plate.

In accordance with the structure mentioned above, since the anode and the lower anode base connected to the return plate are separated, it is unnecessary to take out the return plate at a time of taking out the anode from the laser chamber. Accordingly, it is possible to save labor and time for replacing a battery.

Further, there is provided a laser apparatus provided with a discharge electrodes structure comprising:

a pair of anode and cathode provided within a laser chamber for sealing a laser medium in an opposing manner, generating a discharge so as to excite the laser medium and oscillating a laser beam;

a conductive anode base placed so as to close an opening portion provided in the laser chamber and holding the anode;

an insulative cathode base holding the cathode; and a return plate connecting the anode base to the cathode base and suspending the cathode base from the anode base so as to supply a current to the anode.

In accordance with the structure mentioned above, even in the laser apparatus structured, for example, such that the anode is arranged in the upper portion and the cathode is arranged in the lower portion, it is possible to integrally take the anode and the cathode out of the laser chamber. Accordingly, it is possible to save labor and time for replacing the electrodes.

Further, the laser apparatus provided with the discharge electrodes structure may be structured such that the anode is freely attached and detached with respect to the anode base so as to take the anode out of the laser chamber.

At a time of discharge, the anode is earlier consumed than the cathode. In accordance with the present structure, since it is possible to take the anode which is required to be frequently replaced out of the laser chamber in such a manner as to be independent from the cathode so as to be replaced, it is possible to save labor and time for replacing the battery.

BEST MODE FOR CARRYING OUT THE INVENTION

A description will be in detail given below of embodiments in accordance with the present invention with reference to the accompanying drawings. In each of the embodiments, a description will be given of a case of exemplifying an excimer laser apparatus for a laser apparatus.

Figure 1:
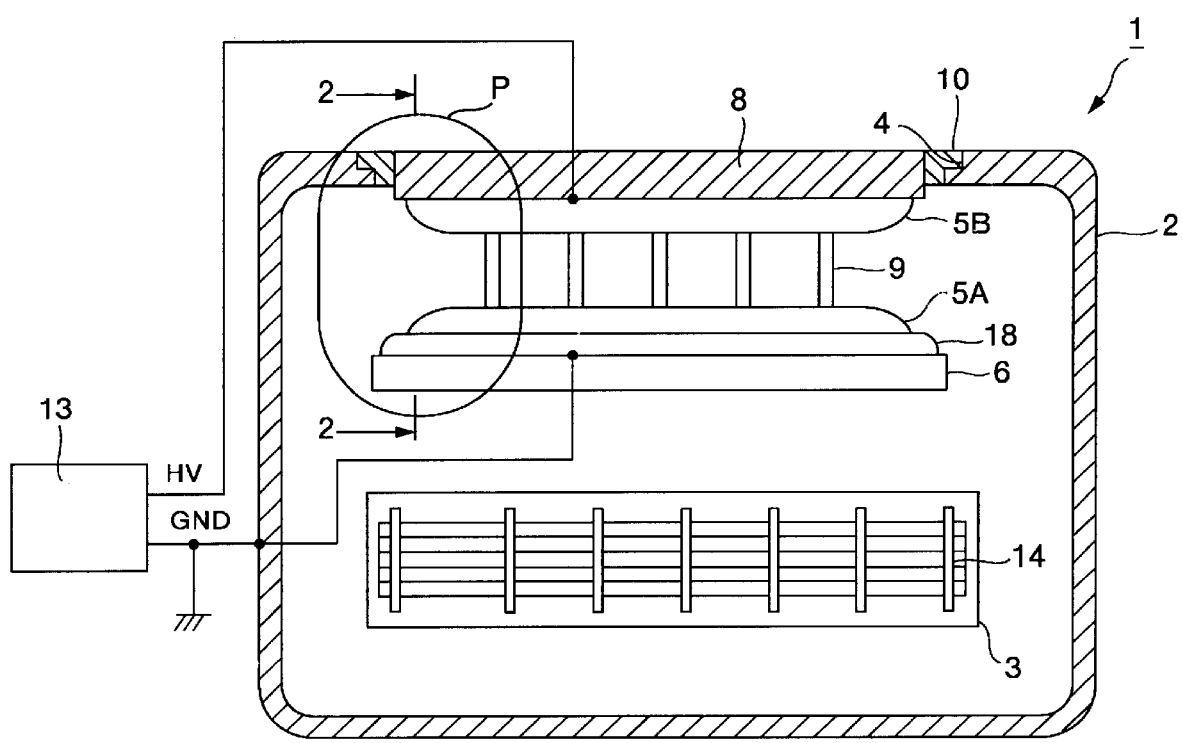
FIG. 1 is a schematic view of an excimer laser apparatus provided with a discharge electrodes structure in accordance with first to fifth embodiments of the present invention.

At first, a description will be given of a first embodiment. FIG. 1 shows a schematic structure of an excimer laser apparatus 1 in accordance with first to fifth embodiments. Further, FIG. 2 is a cross sectional view along a line 2—2 in FIG. 1, and FIG. 3 is a cross sectional view in the vicinity of a portion P in FIG. 1 as seen from a direction along a line 3—3 in FIG. 2.

Figure 2:
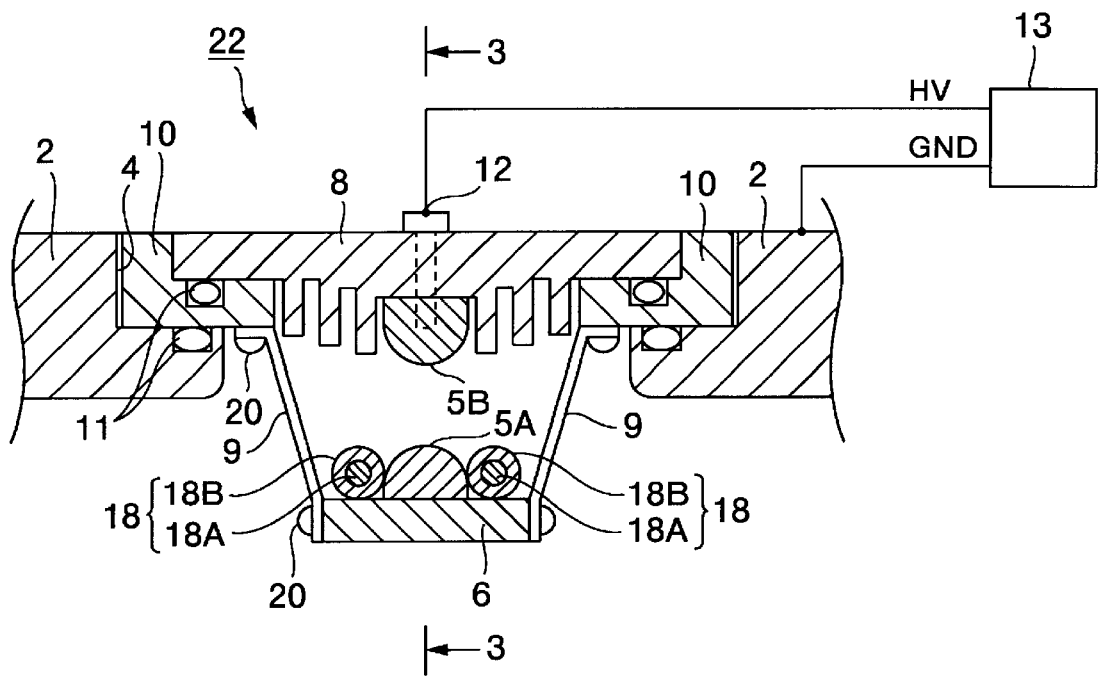
FIG. 2 is a cross sectional view along a line 2—2 in FIG. 1.
Figure 3:
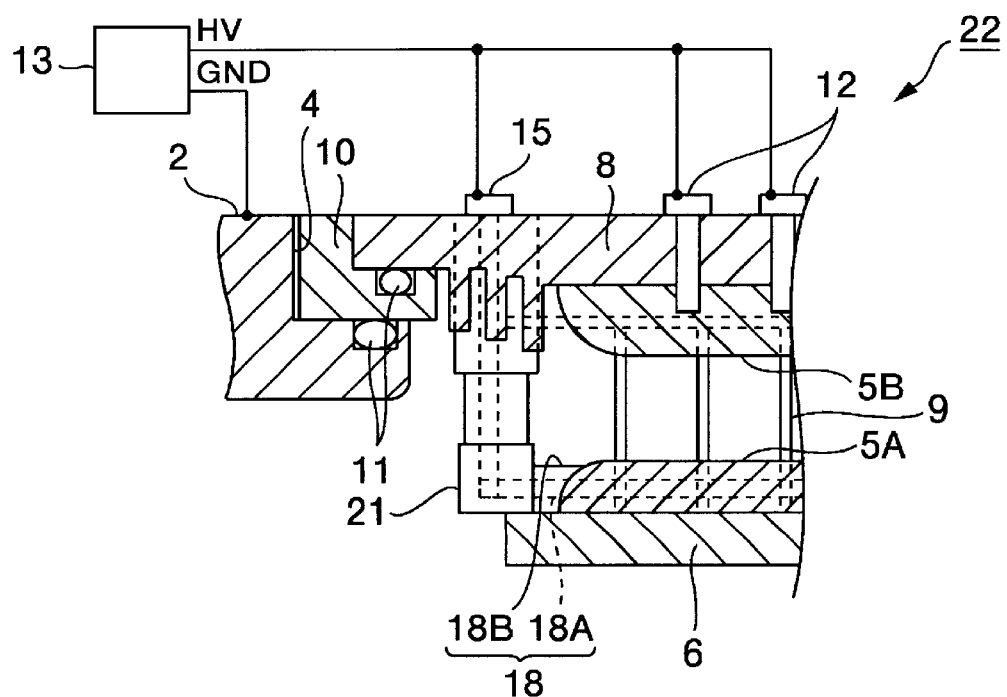
FIG. 3 is a cross sectional view in the vicinity of a portion P in FIG. 1 as seen from a direction along a line 3—3 in FIG. 2.

In FIGS. 1 to 3, the excimer laser apparatus 1 is provided with a laser chamber 2 for sealing a laser medium such as a laser gas or the like. A pair of discharge electrodes 5A and 5B constituted by an anode 5A and a cathode 5B are arranged at a predetermined position in the laser chamber 2 in an opposing manner to keep a predetermined interval. The anode 5A and the cathode 5B are respectively connected to a ground side (GND) of a high voltage power source 13 and a high voltage side (HV) thereof via a discharge circuit (not shown). The excimer laser apparatus 1 generates a discharge between the discharge electrodes 5A and 5B by a high voltage current applied from the high voltage power source 13 and excites a laser medium so as to oscillate a laser beam.

Further, a once through fan 14 for feeding the laser gas to the portion between the discharge electrodes 5A and 5B, and a heat exchanger 3 for cooling the laser gas heated between the discharge electrodes 5A and 5B due to the discharge are arranged at predetermined positions within the laser chamber 2, respectively.

In this case, in the following description, a direction perpendicular to both of a longitudinal direction of the electrodes (a lateral direction in FIG. 1) and an opposing direction of the electrodes (a vertical direction in FIG. 1) is called as a depth direction (a direction perpendicular to a paper surface in FIG. 1). Further, a longitudinal direction of the electrode and an opposing direction of the electrode are respectively called as a longitudinal direction and an opposing direction.

A chamber opening portion 4 is provided in an upper portion of the laser chamber 2, and the chamber opening portion 4 is closed by a cathode base 8 made of an insulative body such as a ceramic or the like, and a bracket 10 suspending the cathode base 8 and made of a conductive body. A cathode 5B is supported to the cathode base 8, and the cathode 5B and the laser chamber 2 are electrically insulated by the cathode base 8.

A high voltage current for being discharged to the cathode 5B is supplied by a plurality of high voltage supply rods 12 arranged in a longitudinal direction at a predetermined interval and passing through the cathode base 8. A portion between the high voltage supply rod 12 and the cathode base 8 is sealed by an O-ring (not shown). Further, O-rings 11 are respectively interposed between the laser chamber 2 and the bracket 10 and between the bracket 10 and the cathode base 8 so as to seal the laser gas.

Upper portions of a plurality of return plates 9 constituted by a conductive body having a predetermined width are fixed to a lower portion of the bracket 10 to keep a predetermined interval in a longitudinal direction by a bolt 20. The conductive anode base 6 for suspending the anode 5A is fixed to the lower portion of the return plate 9 by the bolt 20, and the anode 5A is mounted to an upper portion of the anode base 6. That is, the anode 5A and the anode base 6 are suspended from the bracket 10 by the return plate 9. The laser chamber 2 is connected to the ground side of the high voltage power source 13 via a discharge circuit (not shown), and the anode 5A is also set to be the same potential as that of the laser chamber 2.

Auxiliary ionization electrodes 18 and 18 are arranged along the longitudinal direction, in both side portions of the anode 5A. The auxiliary ionization electrode 18 is provided with a conductive body portion 18A and an insulative body portion 18B covering an outer periphery of the conductive body portion 18A. A current supply insulative member 21 constituted by an insulative body passes through both end portions in the longitudinal direction of the cathode base 8, and an auxiliary current supply rod 15 passes through an inner portion of the current supply insulative member 21.

The portion between the cathode base 8 and the current supply insulative member 21 and the portion between the current supply insulative member 21 and the auxiliary current supply rod 15 are sealed by an O-ring (not shown). The conductive body portion 18A of the auxiliary ionization electrode 18 and the auxiliary current supply rod 15 are electrically connected within the current supply insulative member 21. The high voltage side of the high voltage power source 13 is connected to the auxiliary current supply rod 15 via an auxiliary ionization circuit (not shown) so as to supply the high voltage current to the auxiliary ionization electrode 18.

As described above, in accordance with the first embodiment, the anode 5A and the anode base 6 are suspended by the return plate 9 from the bracket 10 to which the cathode base 8 is fixed. Accordingly, the anode 5A and the cathode 5B can be integrally united and can be integrally taken out from the laser chamber 2. In this case, in the following description, an integral unit of the anode 5A and the cathode 5B is called as an electrodes unit 22.

Accordingly, the discharge electrodes 5A and 5B can be replaced only by taking out the electrodes unit 22 from the laser chamber 2, so that it is possible to save labor and time for disassembling and assembling the laser chamber 2. Further, since the electrodes unit 22 can be assembled in the external portion of the laser chamber 2, it is possible to easily adjust a distance between the anode 5A and the cathode 5B and it is possible to accurately adjust the distance.

Further, when the structure is made such that the electrodes unit 22 which has been used is taken out from the laser chamber 2 and immediately thereafter, the new electrodes unit 22 which was previously assembled is assembled in the laser chamber 2, it is possible to shorten a time required for replacing the discharge electrodes 5A and 5B. Further, since the time for which the chamber opening portion 4 of the laser chamber 2 is open can be shortened, the air enters into the laser chamber 2 at a reduced chance. Accordingly, since the moisture content and the impurity can be attached to the interior portion of the laser chamber 2 and the interior parts at a reduced chance, the time required for the passivation can be shortened and the excimer laser apparatus 1 can be quickly started. Therefore, the machine availability of the excimer laser apparatus 1 can be improved.

In this case, at a time of replacing the electrodes unit 22 mentioned above, it is preferable to replace the electrodes unit 22 while continuously introducing an inert gas such as nitrogen, helium or the like to the laser chamber 2 from gas supply means (not shown). Accordingly, the interior portion of the laser chamber 2 becomes under a higher atmospheric pressure condition than the open air at a time of taking out the electrodes unit 22 from the laser chamber 2, and the inert gas is continuously discharged to the air from the chamber opening portion 4. Therefore, the air does not enter into the laser chamber 2 from the chamber opening portion 4.

Figure 4:
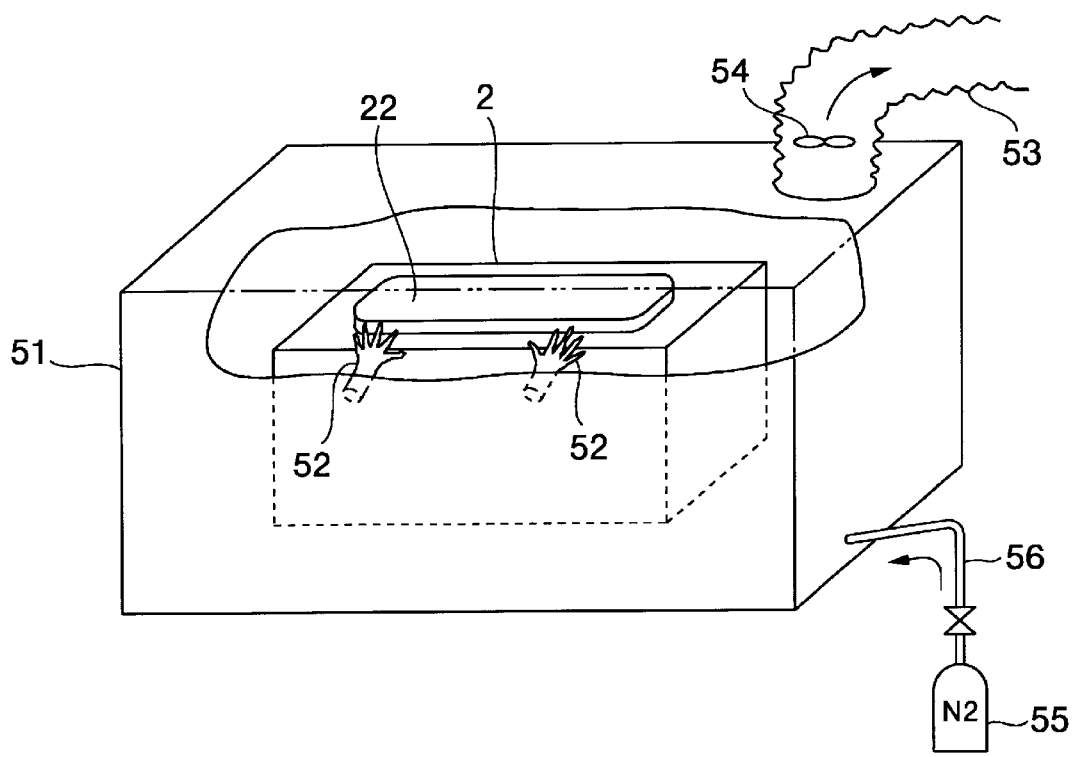
FIG. 4 is a schematic view showing means for attaching and detaching an electrodes unit with respect to the excimer laser apparatus in accordance with a first embodiment inserted within a glove box.

Further, it is more preferable to place the laser chamber 2 within a glove box 51 surrounded by a transparent acrylic resin or glass so as to replace the electrodes unit 22, as shown in FIG. 4. An exhaust duct 53 for exhausting is provided, for example, in an upper portion of the glove box 51, and the structure is made such that the interior portion of the glove box 51 can be exhausted by an exhaust fan 54 provided within the exhaust duct 53. Further, an inert gas bomb 55 for introducing a clean inert gas into the interior portion of the glove box 51 is connected to the glove box 51 via an inert gas pipe 56.

The interior portion of the glove box 51 is always filled with the clean inert gas by introducing the inert gas into the interior portion of the glove box 51 while exhausting the interior portion of the glove box 51. The air is mixed into the interior portion of the laser chamber 2 at a reduced chance by replacing the electrodes unit 22 via gloves 52 and 52 provided on a wall surface of the glove box 51 in this state.

Figure 5:
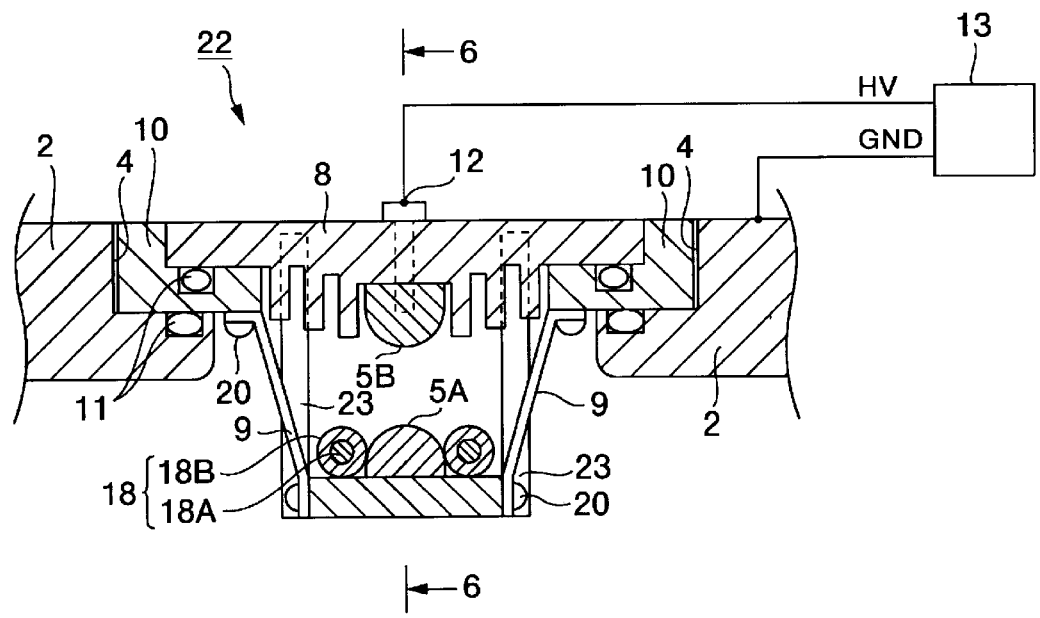
FIG. 5 is a cross sectional view of an excimer laser apparatus in accordance with a second embodiment of the present invention as seen from a direction along the line 2—2 in FIG. 1.

Next, a description will be given of a second embodiment. FIG. 5 is a cross sectional view of an excimer laser apparatus in accordance with a second embodiment as seen from a direction along the line 2—2 in FIG. 1, and FIG. 6 is a cross sectional view in the vicinity of the portion P in FIG. 1 as seen from a direction along a line 6—6 in FIG. 5.

Figure 6:
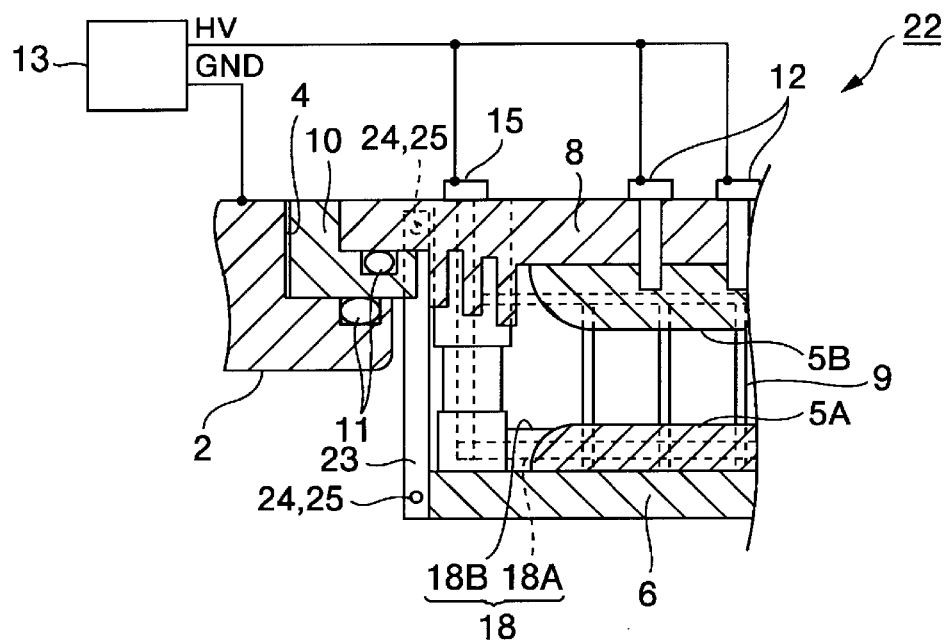
FIG. 6 is a cross sectional view in the vicinity of the portion P in FIG. 1 as seen from a direction along a line 6—6 in FIG. 5.

As shown in FIGS. 5 and 6, an upper portion of an anode support bar 23 constituted by a conductive body or an insulative body is fixed to both end portions in a longitudinal direction of the bracket 10. The conductive anode base 6 for holding the anode 5A is fixed to a lower portion of the anode support bar 23. Accordingly, the anode base 6 is suspended from the bracket 10 by the anode support bar 23. Positioning pins 24 and 24 are respectively inserted into the bracket 10 and the anode base 6. A distance between the anode 5A and the cathode 5B can be set to a predetermined value by inserting the pins 24 and 24 to pin holes 25 and 25 provided in both end portions of the anode support bar 23.

The anode 5A is mounted to the upper portion of the anode base 6. The conductive return plate 9 is overridden between the anode base 6 and the bracket 10 at a predetermined interval in a longitudinal direction. Accordingly, the anode 5A is electrically connected to the laser chamber 2 and becomes in the same potential as that of the laser chamber 2 (grounded).

As mentioned above, in accordance with the second embodiment, the anode base 6 is suspended from the bracket 10 by the anode support bar 23.

Accordingly, in comparison with the first embodiment in which the anode base 6 is suspended by the return plate 9, it is possible to weaken a strength of the return plate 9. That is, since it is possible to reduce a thickness and a width of the return plate 9, the return plate 9 prevents the laser gas flowing between the discharge electrodes 5A and 5B from flowing at a less rate, so that the flow speed of the laser gas between the discharge electrodes 5A and 5B is increased. Accordingly, the discharge operation can be stably performed and a power of the laser beam is increased and made stable.

Further, it is possible to always set positions of the anode 5A in a depth direction and a longitudinal direction with respect to the cathode 5B to the same positions by suspending the anode base 6 by the anode support bar 23 so as to save labor and time for positioning.

Further, the pins 24 and 24 and the pin holes 25 and 25 are respectively provided in the anode base 6, the cathode base 8 and the anode support bar 23 so as to constitute a positioning mechanism. Accordingly, since it is possible to always determine a distance between the anode 5A and the cathode 5B to a predetermined value, it is possible to save labor and time for positioning in an opposing direction. Further, since it is possible to determine a distance between the anode 5A and the cathode 5B in accordance with a mechanical working accuracy of the anode support bar 23, the distance becomes always accurate. Accordingly, it is possible to always set the position of the anode 5A to a proper position with respect to the cathode 5B and the discharge operation can be made stable.

Figure 7:
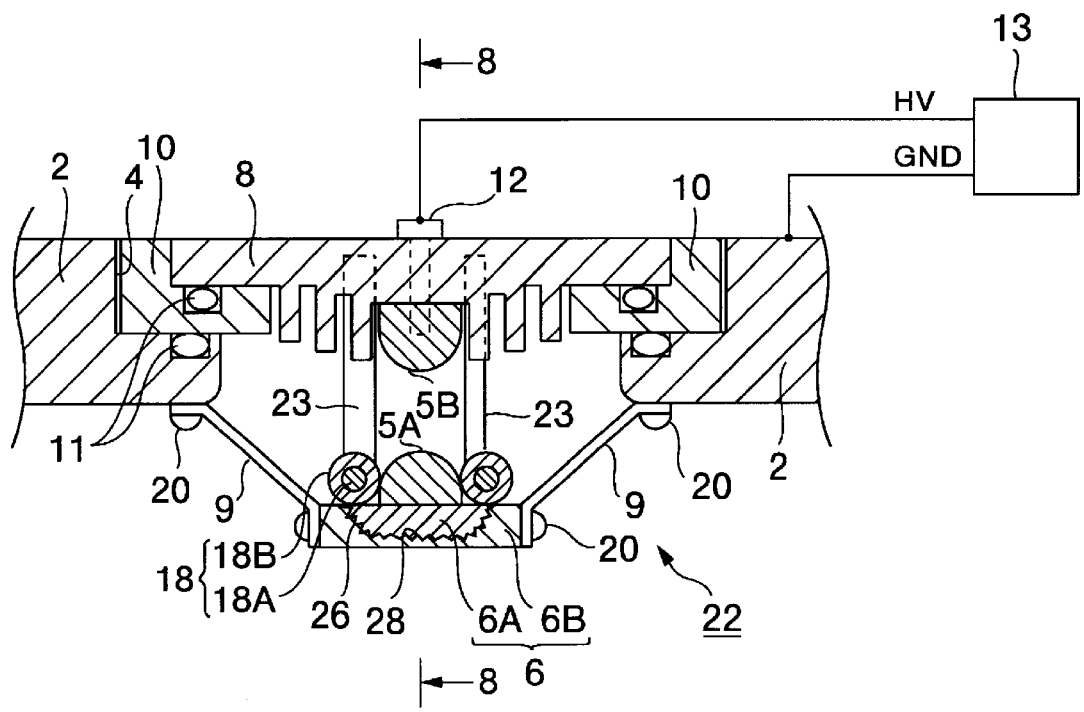
FIG. 7 is a cross sectional view of an excimer laser apparatus in accordance with a third embodiment of the present invention as seen from a direction along the line 2—2 in FIG. 1.

Next, a description will be given of a third embodiment. FIG. 7 is a cross sectional view of an excimer laser apparatus in accordance with a third embodiment as seen from a direction along the line 2—2 in FIG. 1, and FIG. 8 is a cross sectional view in the vicinity of the portion P in FIG. 1 as seen from a direction along a line 8—8 in FIG. 7.

Figure 8:
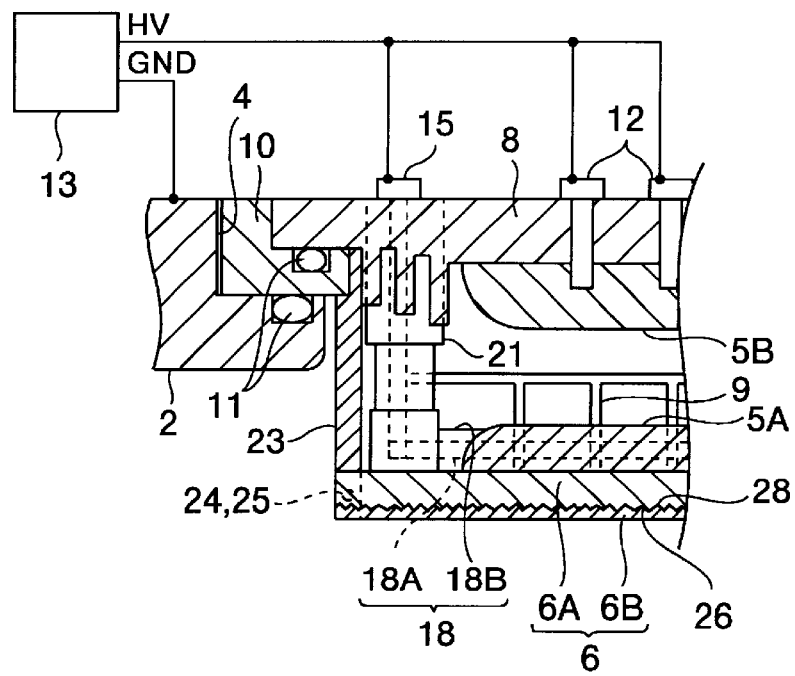
FIG. 8 is a cross sectional view in the vicinity of the portion P in FIG. 1 as seen from a direction along a line 8—8 in FIG. 7.

In FIGS. 7 and 8, the upper portions of a plurality of conductive return plates 9 are fixed to the lower portion near the chamber opening portion 4 of the laser chamber 2 by the bolt 20 at a predetermined interval in a longitudinal direction. The conductive anode base 6 is fixed to the lower portion of the return plate 9 by the bolt 20. The anode base 6 can be freely separated into the upper anode base 6A and the lower anode base 6B. The return plate 9 is fixed to a side of the lower anode base 6B, and the anode 5A is fixed to the upper anode base 6A. The upper anode base 6A and the lower anode base 6B are electrically brought into close contact with each other via contact surfaces 26 and 28 having unevenness each other and conductive.

The upper portion of the anode support bar 23 is fixed to both end portions in the longitudinal direction of the bracket 10, and the upper anode base 6A is fixed to the lower portion of the anode support bar 23. Accordingly, the upper anode base 6A is suspended from the bracket 10 by the anode support bar 23. On the contrary, the lower anode base 6B is suspended from the laser chamber 2 by the return plate 9.

Accordingly, it is possible to integrally take out the bracket 10, the cathode base 8, the cathode 5B, the anode 5A, the anode support bar 23, the anode base 6 and the auxiliary ionization electrodes 18 and 18 corresponding to the electrodes unit 22 from the laser chamber 2. That is, the return plate 9 is not taken out to the external portion of the laser chamber 2. Accordingly, it is unnecessary to take out a multiplicity of return plates 9 from the anode base 6 at a time of replacing the discharge electrodes 5A and 5B, so that it is possible to save labor and time for attaching and detaching. Further, since a multiplicity of return plates 9 being in contact with the air are not taken into an interior portion from the external portion of the laser chamber 2, a surface area of the parts being in contact with the air is reduced and an amount of the moisture content and the impurity mixed into the laser chamber 2 is reduced.

In this case, in the above description, the anode base 6 is supported by the anode support bar 23, however, the structure may be made such that the anode base 6 is supported only by the return plate 9.

Figure 9:
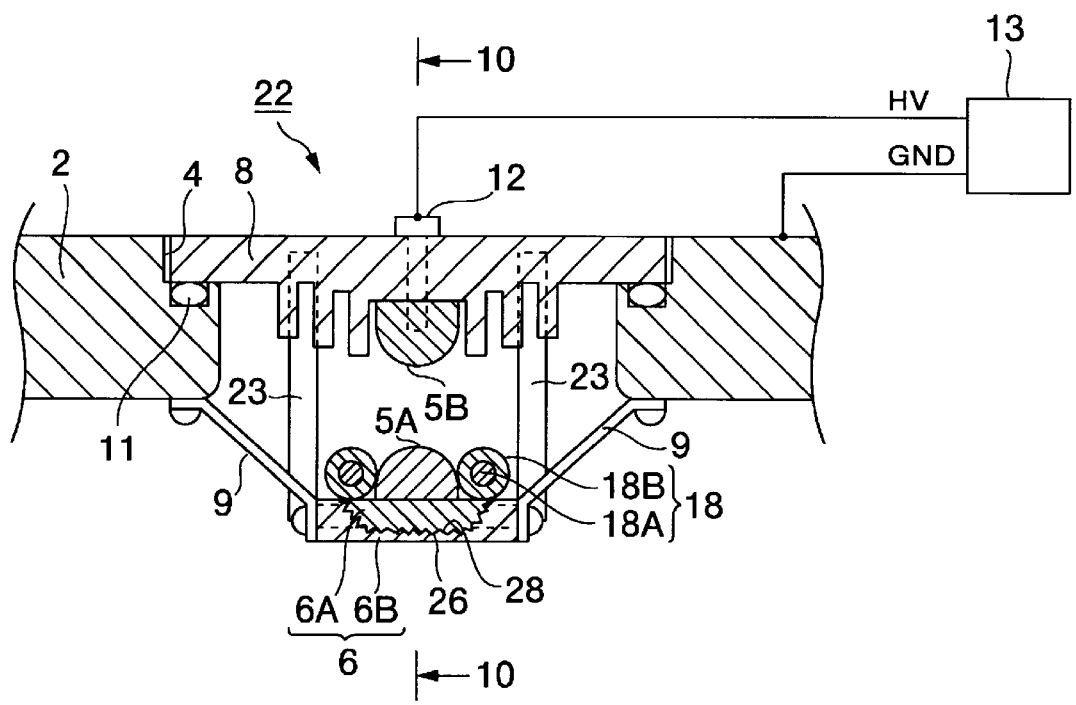
FIG. 9 is a cross sectional view of an excimer laser apparatus in accordance with a fourth embodiment of the present invention as seen from a direction along the line 2—2 in FIG. 1.
Figure 10:
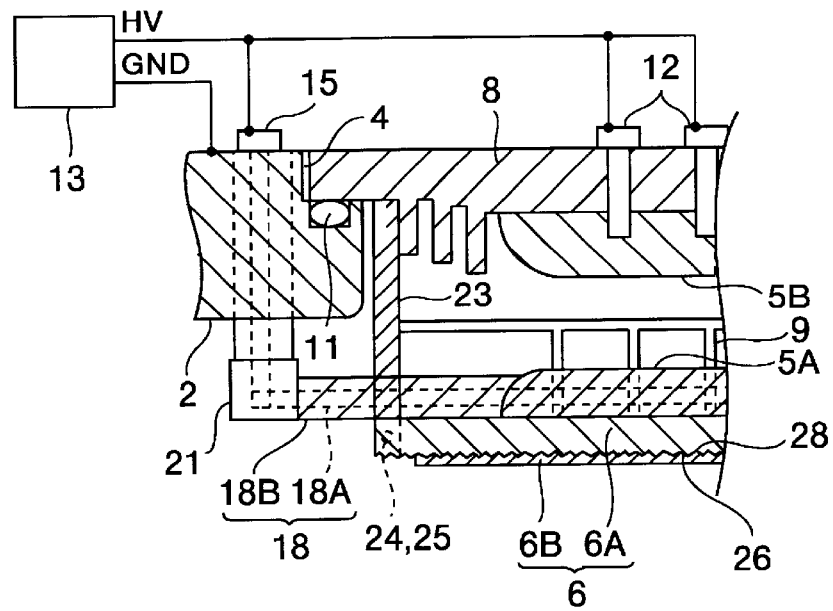
FIG. 10 is a cross sectional view in the vicinity of the portion P in FIG. 1 as seen from a direction along a line 10—10 in FIG. 9.

Next, a description will be given of a fourth embodiment. FIG. 9 is a cross sectional view of an excimer laser apparatus in accordance with a fourth embodiment as seen from a direction along the line 2—2 in FIG. 1, and FIG. 10 is a cross sectional view in the vicinity of the portion P in FIG. 1 as seen from a direction along a line 10—10 in FIG. 9.

In accordance with the fourth embodiment, as shown in FIG. 9, a size of the upper anode base 6A in a depth direction is set to be substantially the same as a size of the anode 5A in a depth direction. Then, as shown in FIG. 10, the current supply insulative member 21 constituted by an insulative body passes through both end portions in the longitudinal direction of the laser chamber 2, and the auxiliary current supply rod 15 passes through an inner portion of the current supply insulative member 21.

The conductive body portion 18A of the auxiliary ionization electrode 18 and the auxiliary current supply rod 15 are electrically connected to each other within the current supply insulative member 21 so as to supply a high voltage current to the auxiliary ionization electrode 18 from the auxiliary current supply rod 15. A portion between the auxiliary current supply rod 15 and the current supply insulative member 21 and a portion between the current supply insulative member 21 and the laser chamber 2 are respectively sealed by O-rings (not shown).

Accordingly, it is possible to integrally take out the bracket 10, the cathode base 8, the cathode 5B, the anode 5A, the anode support bar 23, and the anode base 6 corresponding to the electrodes unit 22 from the laser chamber 2. Accordingly, since it is unnecessary to take out the auxiliary ionization electrodes 18 and the auxiliary ionization electrodes 18 are not taken into the interior portion from the exterior portion of the laser chamber 2, a surface area of the parts being in contact with the air is reduced and an amount of the moisture content and the impurity mixed into the laser chamber 2 is reduced.

In this case, in the above description, the anode base 6 is suspended by the anode support bar 23, however, the structure may be made such that the anode base 6 is suspended only by the return plate 9.

Figure 11:
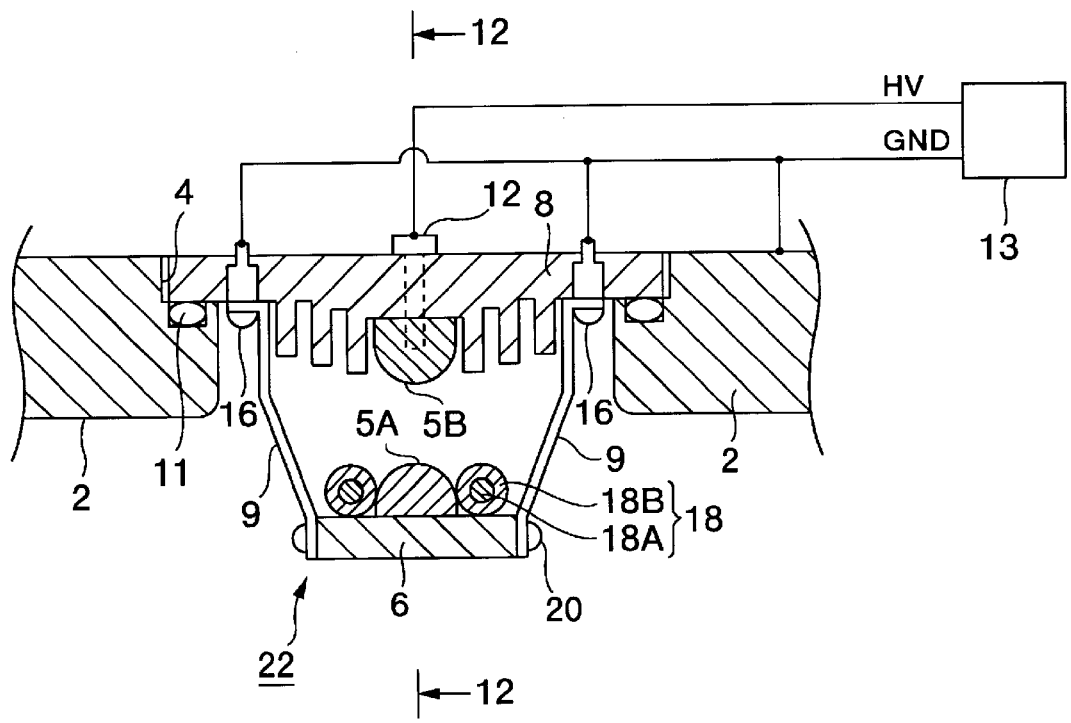
FIG. 11 is a cross sectional view of an excimer laser apparatus in accordance with a fifth embodiment of the present invention as seen from a direction along the line 2—2 in FIG. 1.

Next, a description will be given of a fifth embodiment. FIG. 11 is a cross sectional view of an excimer laser apparatus in accordance with a fifth embodiment as seen from a direction along the line 2—2 in FIG. 1, and FIG. 12 is a cross sectional view in the vicinity of the portion P in FIG. 1 as seen from a direction along a line 12—12 in FIG. 11.

Figure 12:
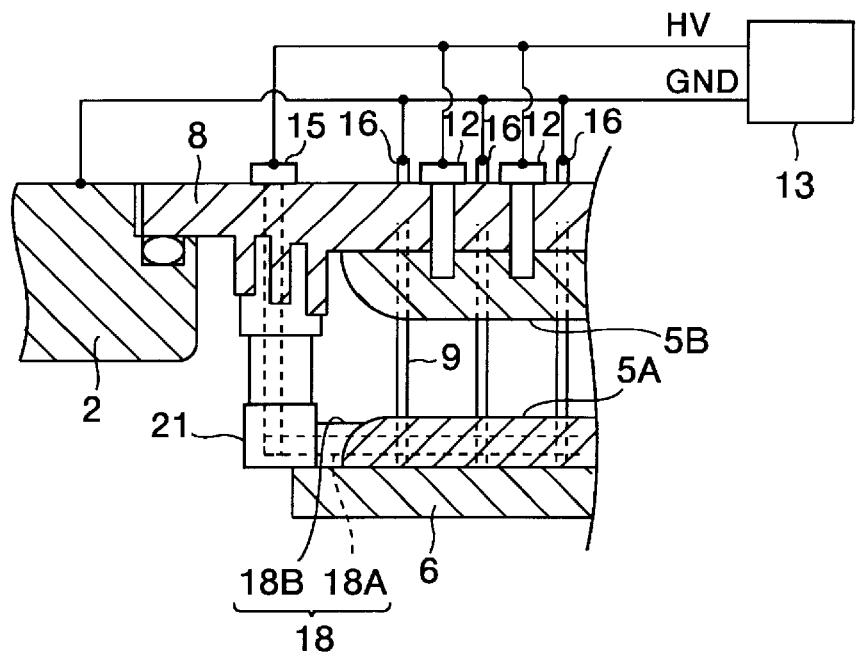
FIG. 12 is a cross sectional view in the vicinity of the portion P in FIG. 1 as seen from a direction along a line 12—12 in FIG. 11.

In FIGS. 11 and 12, the chamber opening portion 4 of the laser chamber 2 is sealed by the cathode base 8. The upper portion of the return plate 9 is fixed to the cathode base 8 by a ground current supply rod 16, and the anode base 6 is fixed to the lower portion of the return plate 9 by the bolt 20. The anode 5A and the auxiliary ionization electrodes 18 and 18 are mounted on the anode base 6. The ground current supply rod 16 passes through the cathode base 8 and seals the laser gas by an O-ring (not shown). Then, the ground current supply rod 16 is connected to the ground side of the high voltage power source 13 so as to set the anode 5A in the same potential as that of the laser chamber 2 (in the grounded condition).

As mentioned above, in accordance with the fifth embodiment, the chamber opening portion 4 of the laser chamber 2 is sealed only by the cathode base 8. Accordingly, the bracket 10 is not required, the number of the parts can be reduced and the assembly can be easily performed. Further, the O-ring 11 for sealing the laser gas is omitted and a leakage of the laser gas is reduced.

Figure 13:
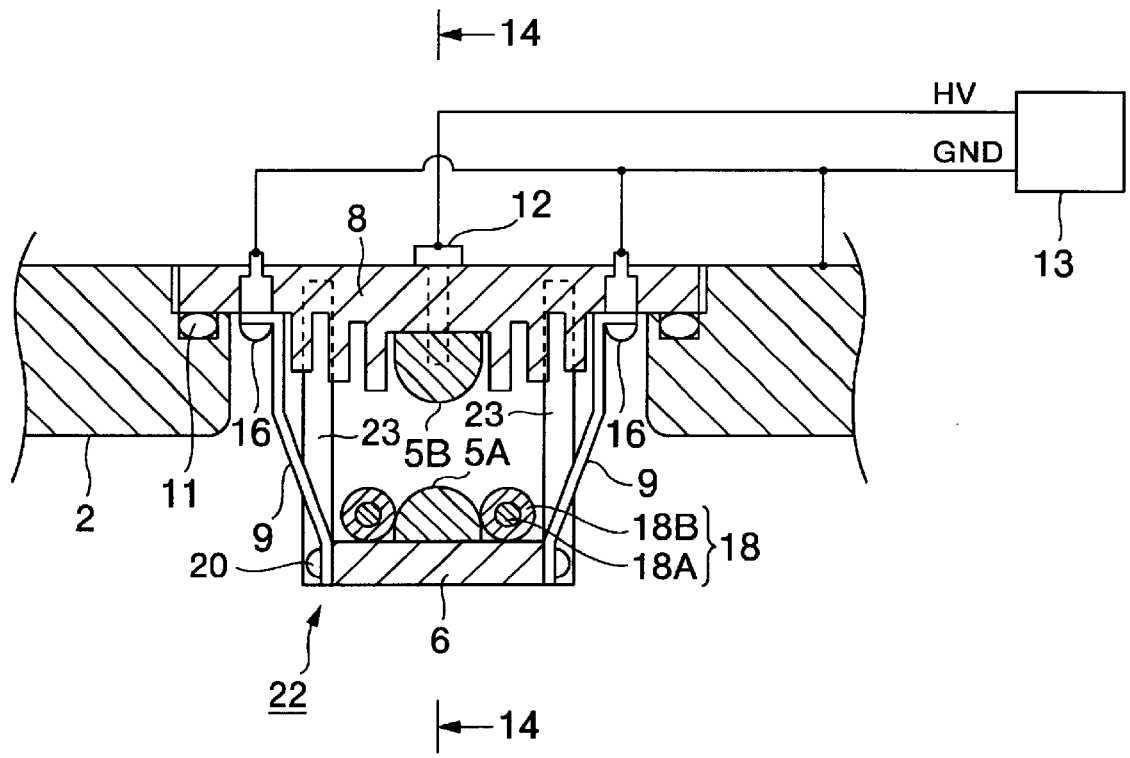
FIG. 13 is a cross sectional view of an embodiment of another structure of the excimer laser apparatus in accordance with the fifth embodiment of the present invention as seen from a direction along the line 2—2 in FIG. 1.
Figure 14:
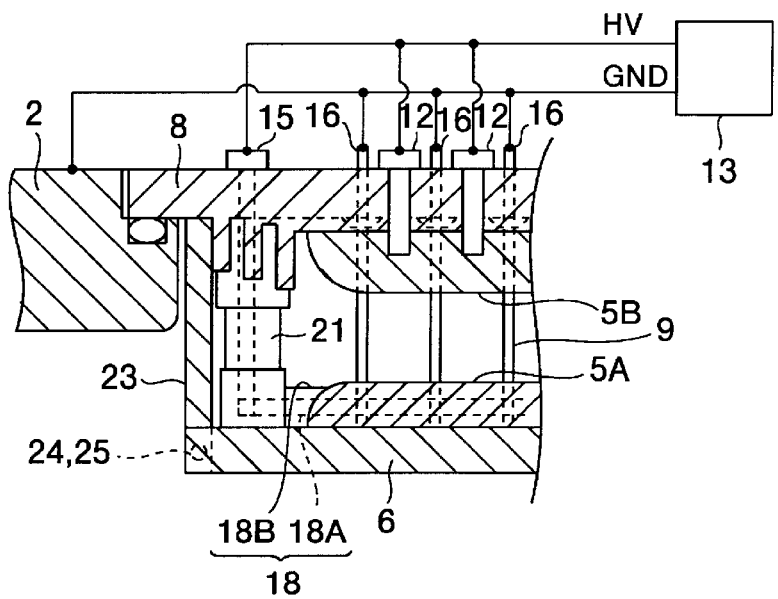
FIG. 14 is a cross sectional view in the vicinity of the portion P in FIG. 1 as seen from a direction along a line 14—14 in FIG. 13.

FIGS. 13 and 14 show embodiments of another structure of the excimer laser apparatus 1 in accordance with the fifth embodiment, in which FIG. 13 is a cross sectional view as seen from a direction along the line 2—2 in FIG. 1, and FIG. 14 is a cross sectional view in the vicinity of the portion P in FIG. 1 as seen from a direction along a line 14—14 in FIG. 13.

In FIGS. 13 and 14, the anode base 6 is suspended from the cathode base 8 by the anode support bar 23. In accordance with the structure mentioned above, as mentioned in the second embodiment, it is possible to easily determine the distance between the anode 5A and the cathode 5B to a predetermined value.

Figure 15:
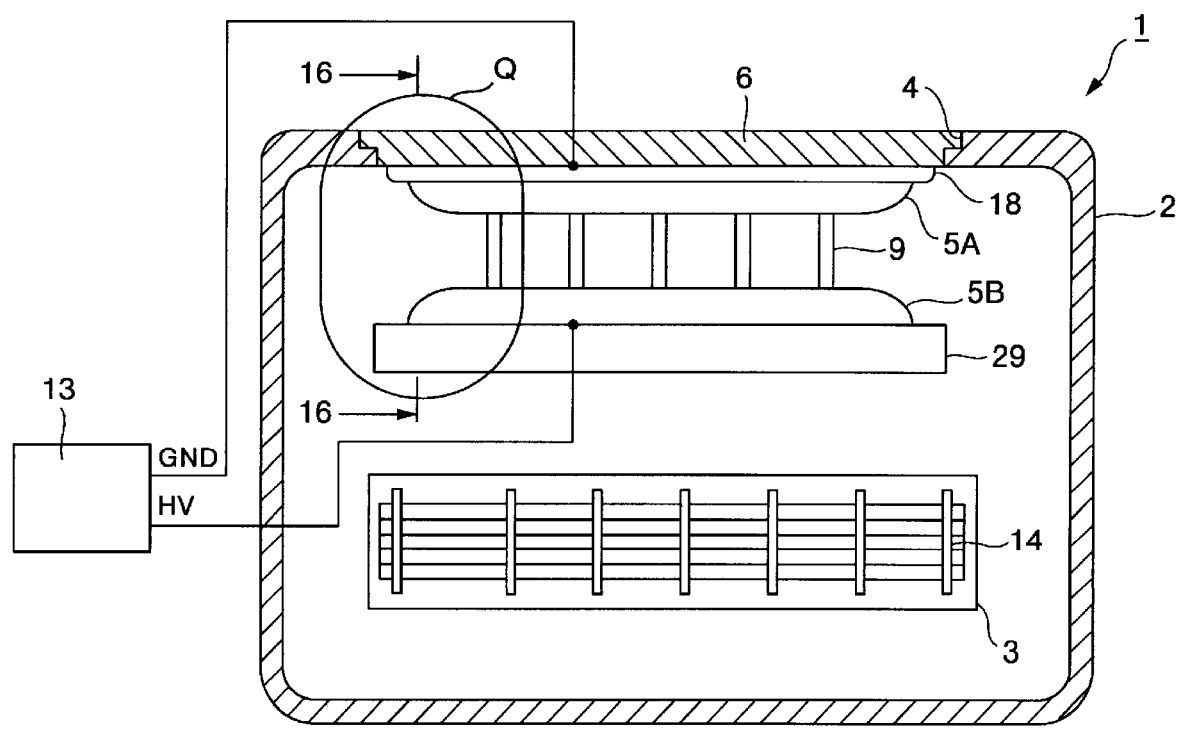
FIG. 15 is a schematic view of an excimer laser apparatus provided with a discharge electrodes structure in accordance with sixth and seventh embodiments of the present invention.

Next, a description will be given of a sixth embodiment. FIG. 15 is a schematic view showing a summarized structure of an excimer laser apparatus in accordance with sixth and seventh embodiments of the present invention. Further, FIG. 16 is a cross sectional view along a line 16—16 in FIG. 15, and FIG. 17 is a cross sectional view in the vicinity of a portion Q in FIG. 15 as seen from a direction along a line 17—17 in FIG. 16.

Figure 16:
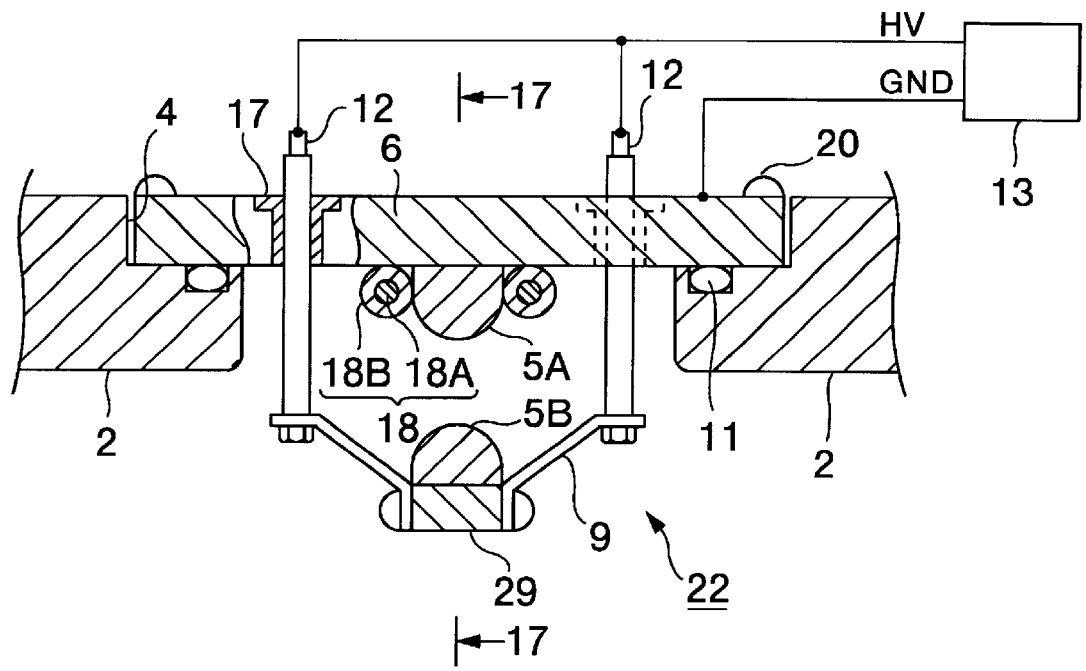
FIG. 16 is a cross sectional view along a line 16—16 in FIG. 15.
Figure 17:
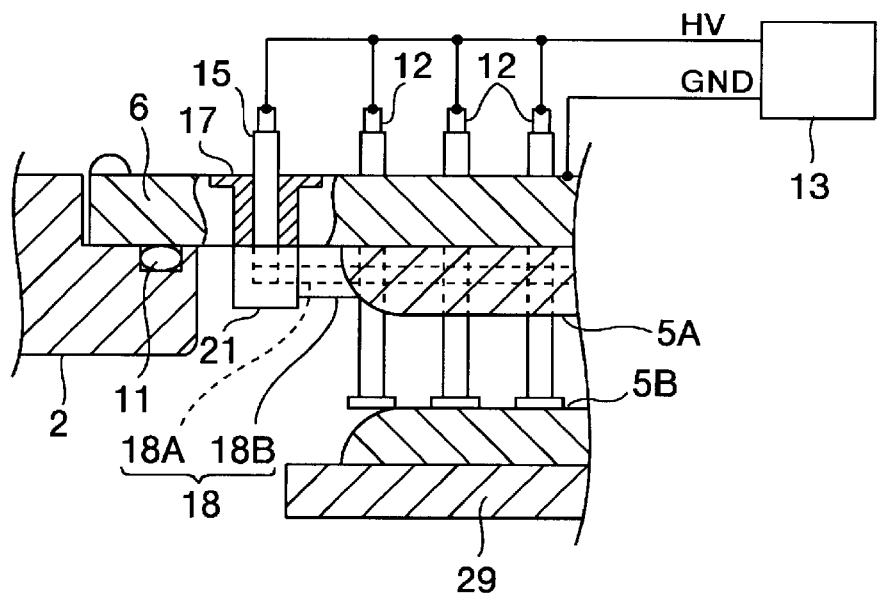
FIG. 17 is a cross sectional view in the vicinity of a portion Q in FIG. 15 as seen from a direction along a line 17—17 in FIG. 16.

In FIGS. 15 to 17, the excimer laser apparatus 1 is provided with the laser chamber 2 for sealing the laser medium such as the laser gas or the like. Within the laser chamber 2, the anode 5A is arranged in the upper portion and the cathode 5B is arranged in the lower portion in an opposing manner. The anode 5A is mounted to the conductive anode base 6, and the anode base 6 closes the chamber opening portion 4 of the laser chamber 2 and is in the same potential as that of the laser chamber 2 (grounded).

A plurality of insulative terminals 17 constituted by an insulative body are inserted into both sides in a depth direction of the anode 5A in the anode base 6 at a predetermined interval in a longitudinal direction in such a manner as to pass through the anode base 6. The high pressure current supply rod 12 passes through the interior portion of the insulative terminal 17. The upper portion of the return plate 9 is connected to the lower portion of the high voltage current supply rod 12, and a conductive cathode base 29 is connected to the lower portion of the return plate 9. The cathode 5B is mounted to the cathode base 29. The high voltage current supply rod 12 is connected to the high voltage side of the high voltage power source 13 via a discharge circuit (not shown) so as to supply a high voltage current to the cathode 5B.

The auxiliary ionization electrodes 18 and 18 are arranged along a longitudinal direction, in both side portions of the anode 5A. The insulative terminal 17 constituted by the insulative body is inserted into both end portions in the longitudinal direction of the anode base 6 in such a manner as to pass through, and the auxiliary current supply rod 15 passes through the interior portion of the insulative terminal 17. A portion between the auxiliary current supply rod 15 and the insulative terminal 17 and a portion between the insulative terminal 17 and the anode base 6 are sealed by an O-ring (not shown). The auxiliary current supply rod 15 and the conductive body portion 18A of the auxiliary ionization electrode 18 are connected to each other within the current supply insulative member 21. The auxiliary current supply rod 15 is connected to the high voltage side of the high voltage power source 13 via an auxiliary ionization circuit (not shown) so as to supply a high voltage current to the auxiliary ionization electrode 18.

As mentioned above, in accordance with the sixth embodiment, the anode 5A is arranged in the upper portion, and the cathode 5B is arranged in the lower portion. Even in the arrangement mentioned above, it is possible to integrally unite the anode 5A and the cathode 5B so as to form the electrode unit 22, thereby integrally attaching and detaching to and from the laser chamber 2.

Figure 18:
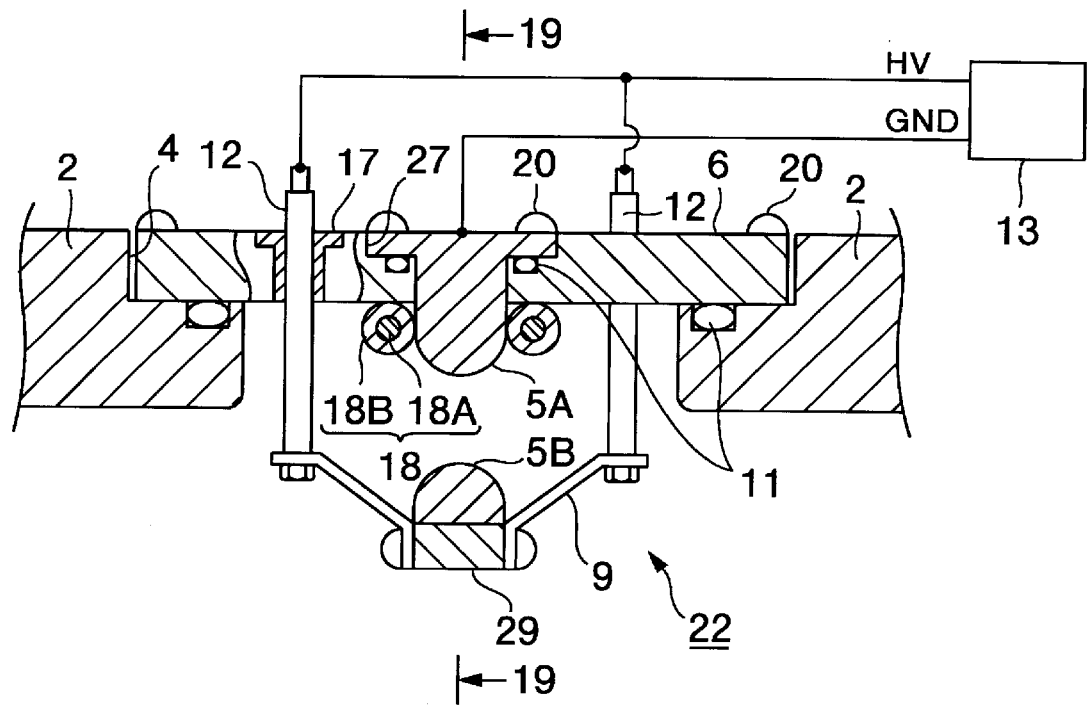
FIG. 18 is a cross sectional view of an excimer laser apparatus in accordance with a seventh embodiment of the present invention as seen from a direction along the line 16—16 in FIG. 15.

Next, a description will be given of a seventh embodiment. FIG. 18 is a cross sectional view of an excimer laser apparatus in accordance with a seventh embodiment of the present invention as seen from a direction along the line 16—16 in FIG. 15, and FIG. 19 is a cross sectional view in the vicinity of the portion Q in FIG. 15 as seen from a direction along a line 19—19 in FIG. 18.

Figure 19:
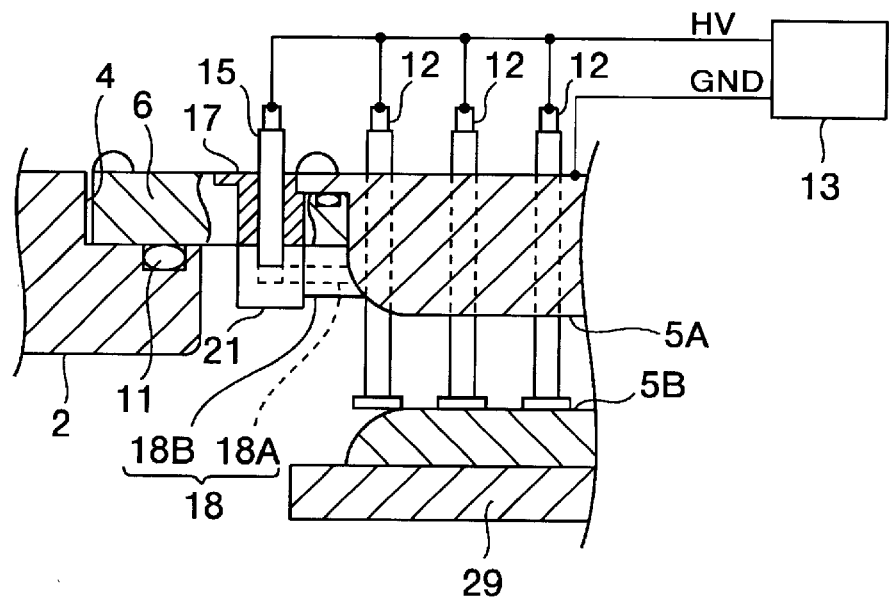
FIG. 19 is a cross sectional view in the vicinity of the portion Q in FIG. 15 as seen from a direction along a line 19—19 in FIG. 18.

In FIGS. 18 and 19, the chamber opening portion 4 of the laser chamber 2 is closed by the anode base 6. An anode opening portion 27 is provided in the anode base 6, and the anode 5A is inserted to the anode opening portion 27 from the outer side of the laser chamber 2. The anode 5a is fixed to the anode base 6 by the bolt 20, and a portion between the anode 5A and the anode base 6 is sealed by the O-ring 11. The auxiliary ionization electrodes 18 and 18 are arranged along a longitudinal direction, in the lower portion of the anode base 6 and both side portions of the anode 5A.

As mentioned above, in accordance with the seventh embodiment, since the anode 5A is inserted to the anode base 6 from the outer side of the laser chamber 2, it is possible to take out only the anode 5A which is easily consumed so as to be replaced. Accordingly, since labor and time for replacement is not much required and it is possible to replace by opening only the anode opening portion 27 which is comparatively small, the air enters into the laser chamber 2 at a less rate. Further, since only the anode 5A is in contact with the air, a surface area to which the impurity and the moisture content are attached is small and it is possible to shorten the time for passivation.

Further, in the case of replacing both of the anode 5A and the cathode 5B, it is possible to integrally take out both of the elements corresponding to the electrodes unit 22 by taking out the bolt 20 fixing the anode base 6 to the laser chamber 2. Accordingly, it is possible to efficiently replace the discharge electrodes 5A and 5B as occasion demands.

Figure 20:
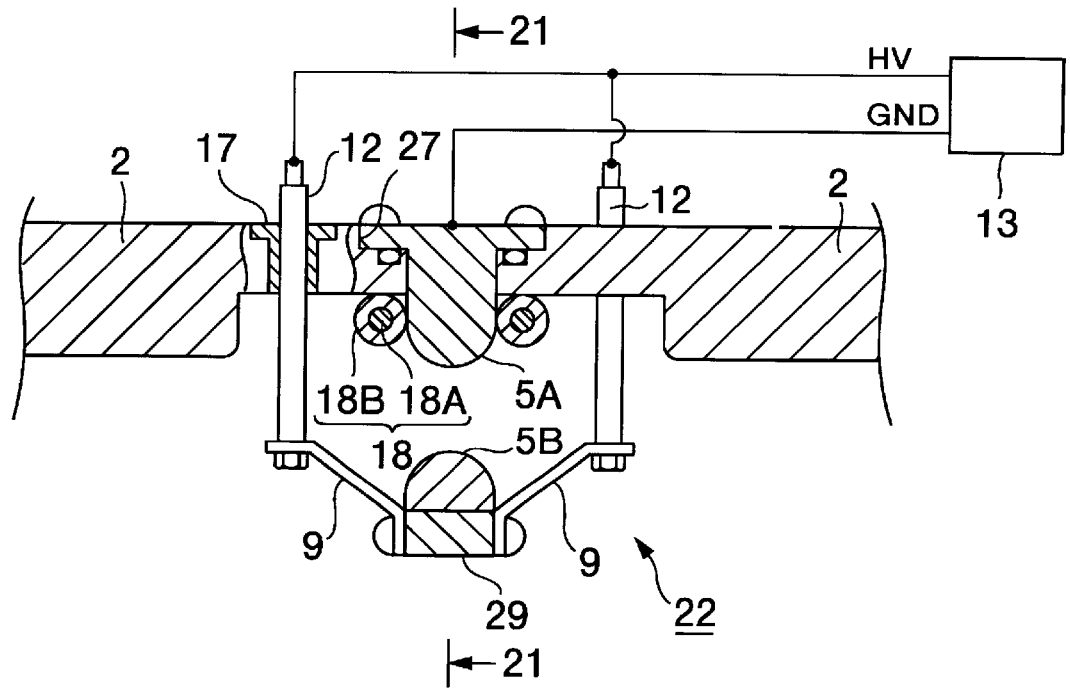
FIG. 20 is a cross sectional view of an embodiment of another structure of the excimer laser apparatus in accordance with the seventh embodiment of the present invention as seen from a direction along the line 16—16 in FIG. 15.
Figure 21:
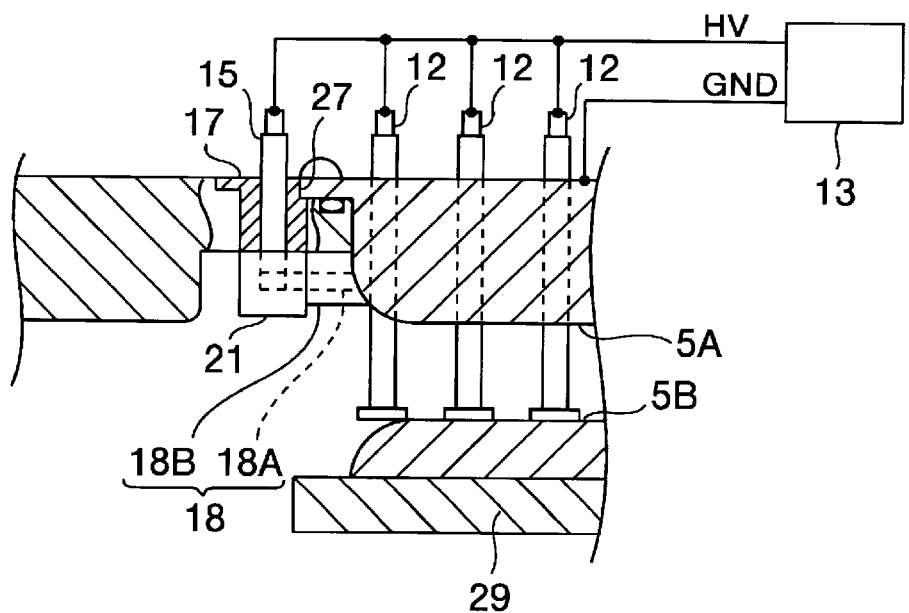
FIG. 21 is a cross sectional view in the vicinity of the portion Q in FIG. 15 as seen from a direction along a line 21—21 in FIG. 20.

FIGS. 20 and 21 show an embodiment of another structure of the excimer laser apparatus 1 in accordance with the seventh embodiment. FIG. 20 is a cross sectional view as seen from a direction along the line 16—16 in FIG. 15, and FIG. 21 is a cross sectional view in the vicinity of the portion Q in FIG. 15 as seen from a direction along a line 21—21 in FIG. 20.

In accordance with FIGS. 20 and 21, the structure is made such that the anode opening portion 27 is provided in the upper portion of the laser chamber 2 so as to insert the anode 5A to the anode opening portion 27 from the external portion of the laser chamber 2. At this time, the high voltage current supply rod 12 for supplying the high voltage current to the cathode 5B and the insulative terminal 17 pass through the laser chamber 2. In accordance with the structure mentioned above, since the anode base 6 is not required, the structure can be made simple and it is possible to easily replace the anode 5A which is required to be frequently replaced.

Figure 22:
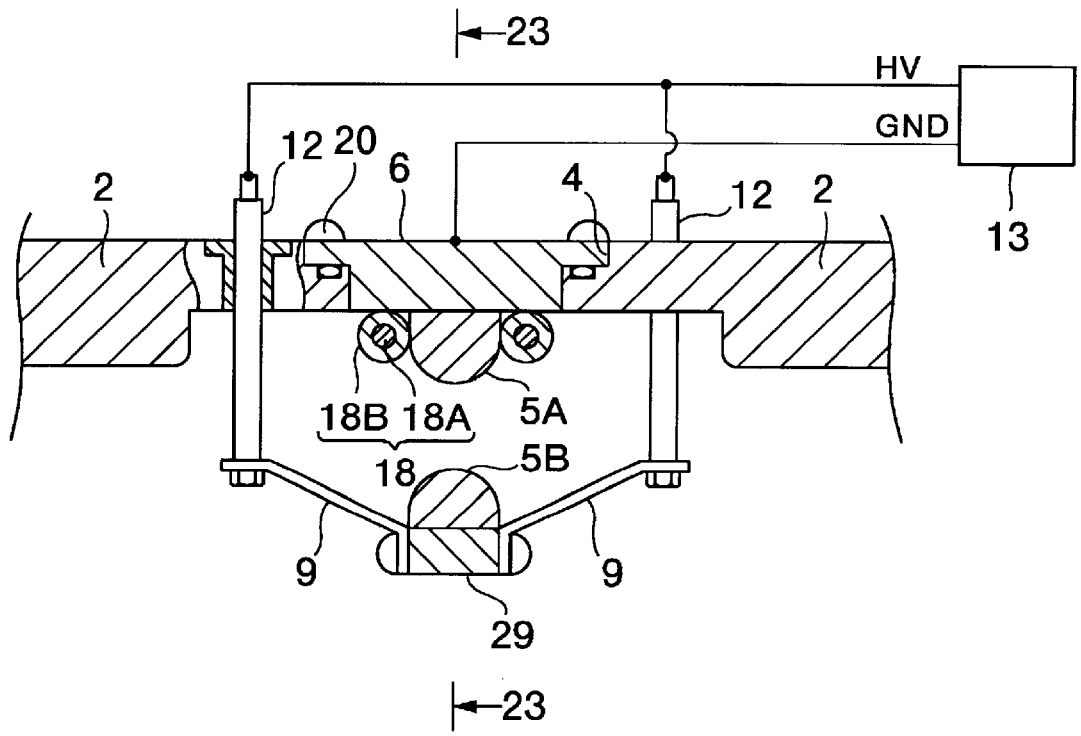
FIG. 22 is a cross sectional view of a second embodiment of another structure of the excimer laser apparatus in accordance with the seventh embodiment of the present invention as seen from a direction along the line 16—16 in FIG. 15.
Figure 23:
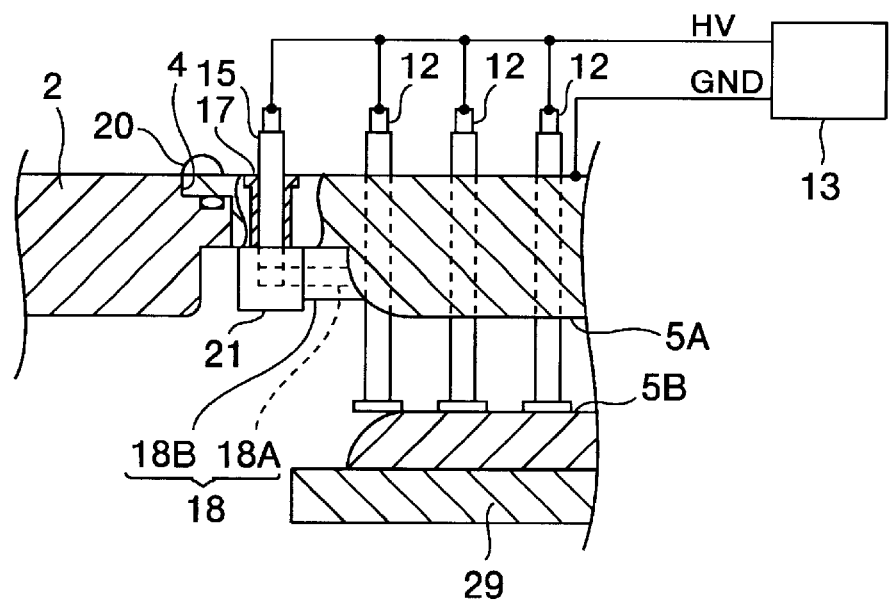
FIG. 23 is a cross sectional view in the vicinity of the portion Q in FIG. 15 as seen from a direction along a line 23—23 in FIG. 22.
Figure 24:
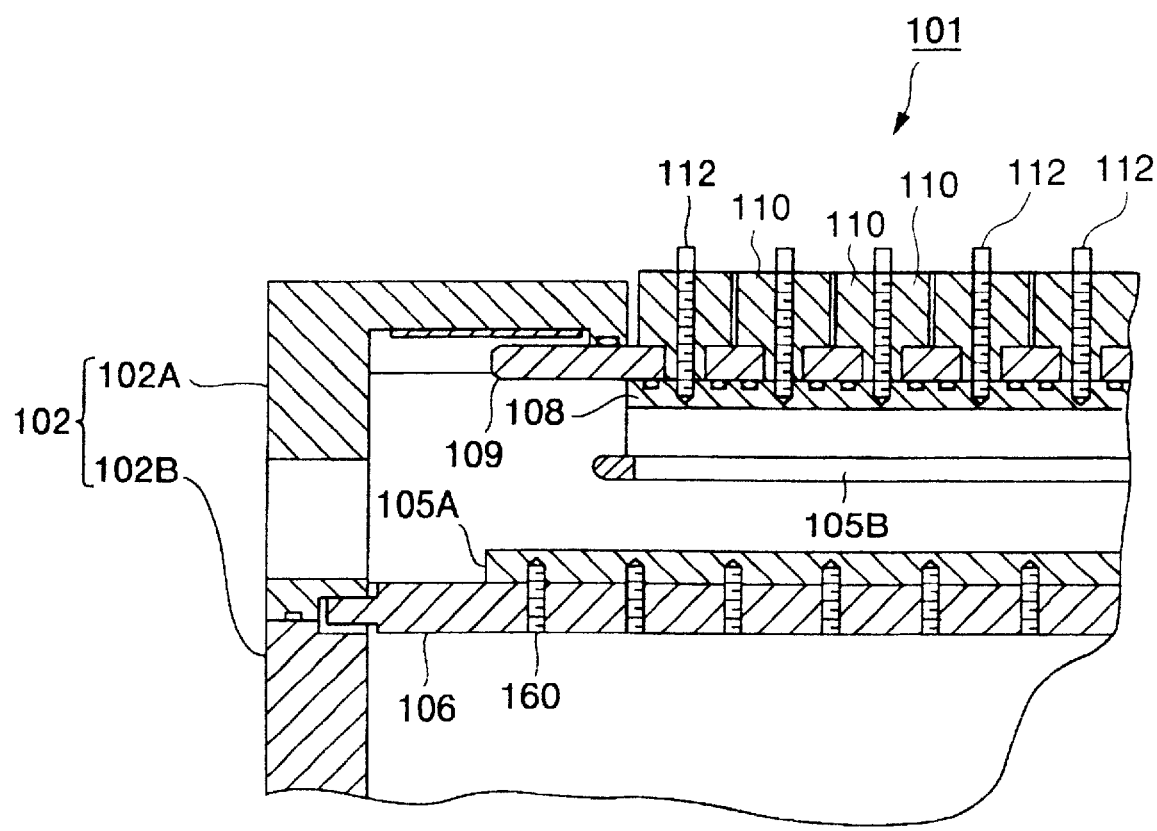
FIG. 24 is a partly cross sectional view of an excimer laser apparatus in accordance with the conventional art.

FIGS. 22 and 23 show a second embodiment of another structure of the excimer laser apparatus 1 in accordance with the seventh embodiment. FIG. 22 is a cross sectional view as seen from a direction along the line 16—16 in FIG. 15, and FIG. 23 is a cross sectional view in the vicinity of the portion Q in FIG. 15 as seen from a direction along a line 23—23 in FIG. 22.

In FIGS. 22 and 23, the auxiliary ionization electrode 18 is attached to the anode base 6. At this time, the auxiliary current supply rod 15 and the insulative terminal 17 pass through the anode base 6. In accordance with the structure mentioned above, since it is possible to integrally take out the auxiliary ionization electrode 18 and the anode 5A, it is possible to easily replace even at a time when it is required to replace the auxiliary ionization electrode 18.

In this case, in the description mentioned above, the excimer laser apparatus 1 is employed for the embodiment of the laser apparatus, however, the structure is not limited to this, and it is possible to apply a laser apparatus as far as the structure is made such as to excite the laser medium in accordance with the discharge operation so as to oscillate the laser beam.

What is claimed is:

1. A laser apparatus provided with a discharge electrodes structure comprising:

a pair of anode and cathode provided within a laser chamber for sealing a laser medium in an opposing manner, generating a discharge so as to excite the laser medium and oscillating a laser beam;

a conductive anode base holding the anode;

an insulative cathode base placed so as to close an opening portion provided in said laser chamber and holding the cathode; and a return plate suspending said conductive anode base from a conductive bracket supporting the insulative cathode base, wherein a current to said anode is supplied through said return plate.

2. A laser apparatus provided with a discharge electrodes structure comprising:

a pair of anode and cathode provided within a laser chamber for sealing a laser medium in an opposing manner, generating a discharge so as to excite the laser medium and oscillating a laser beam;

a conductive anode base holding the anode;

an insulative cathode base placed so as to close an opening portion provided in said laser chamber and holding the cathode; and a return plate suspending said conductive anode base from a ground current supply rod fixed into the insulative cathode base, wherein a current to said anode is supplied through said return plate.

3. A laser apparatus provided with a discharge electrodes structure as claimed in claim 1 or 2, further comprising an anode support bar, separate from said return plate, for connecting said cathode base to said anode base so as to suspend said anode from the cathode base.

4. A laser apparatus provided with a discharge electrodes structure comprising:

a pair of anode and cathode provided within a laser chamber for sealing a laser medium in an opposing manner, generating a discharge so as to excite the laser medium and oscillating a laser beam;

a conductive anode base holding the anode;

an insulative cathode base placed so as to close an opening portion provided in said laser chamber and holding the cathode; and a return plate suspending said anode base from the cathode base so as to supply a current to said anode, wherein said anode base is freely separated into an upper anode base for holding said anode and a lower anode base connected to said return plate.

5. A discharge electrodes structure comprising:

a pair of anode and cathode provided with a laser chamber for sealing a laser medium in an opposing manner, generating a discharge so as to excite the laser medium and oscillating a laser beam;

a conductive anode base placed so as to close an opening portion provided in said laser chamber and holding the anode;

a conductive cathode base holding the cathode; and a return plate connecting the conductive anode base to the conductive cathode base thereby suspending the conductive cathode base from the conductive anode base, wherein a current to said anode is supplied through said return plate.

6. A laser apparatus provided with a discharge electrodes structure as claimed in claim 5, wherein said anode is freely attached and detached, with respect to said anode base, from the outer side of said laser chamber without removing the anode base closing the opening portion of said laser chamber.

7. A laser apparatus provided with a discharge electrodes structure comprising:

a pair of anode and cathode provided within a laser chamber for sealing a laser medium in an opposing manner, generating a discharge so as to excite the laser medium and oscillating a laser beam;

a conductive anode base holding the anode;

an insulative cathode base placed so as to close an opening portion provided in said laser chamber and holding the cathode;

a return plate suspending said anode base from the cathode base so as to supply a current to said anode; and an anode support bar, separate from said return plates, for connecting said cathode base to said anode base so as to suspend said anode from the cathode base, wherein said anode base is freely separated into an upper anode base for holding said anode and a lower anode base connected to said return plate.

\* \* \* \* \*